(12) United States Patent
Erickson et al.

(10) Patent No.: US 8,776,166 B1
(45) Date of Patent: Jul. 8, 2014

(54) PLUG-IN BASED POLICY EVALUATION

(75) Inventors: Steven Erickson, Newton, MA (US);
Oliver Kourosh Tavakoli, Sudbury, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1174 days.

(21) Appl. No.: 11/457,938

(22) Filed: Jul. 17, 2006

(51) Int. Cl.
*G06F 17/00* (2006.01)

(52) U.S. Cl.
USPC .......................................................... 726/1

(58) Field of Classification Search
USPC .................................. 726/1–2, 21
See application file for complete search history.

(56) References Cited

U.S. PATENT DOCUMENTS

| | | | | |
|---|---|---|---|---|
| 6,324,648 | B1* | 11/2001 | Grantges, Jr. | 726/12 |
| 6,449,721 | B1* | 9/2002 | Pensak et al. | 713/171 |
| 7,266,538 | B1* | 9/2007 | Shatil | 1/1 |
| 7,580,701 | B2* | 8/2009 | Ross et al. | 455/411 |
| 2004/0122956 | A1* | 6/2004 | Myers et al. | 709/228 |
| 2005/0060167 | A1* | 3/2005 | Patron et al. | 705/1 |
| 2006/0048218 | A1* | 3/2006 | Lingafelt et al. | 726/11 |
| 2006/0095779 | A9* | 5/2006 | Bhat et al. | 713/182 |
| 2006/0136985 | A1* | 6/2006 | Ashley et al. | 726/1 |

OTHER PUBLICATIONS

"TCG Specification Architecture Overview", Specification, Revision 1.2, Apr. 28, 2004, 54 pages.
"TCG Trusted Network Connect TNC IF-PEP: Protocol Bindings for Radius", Specification Version 1.0, Revision 2, May 1, 2006 Published, 25 pages.
"TCG Trusted Network Connect TNC IF-T: Protocol Bindings for Tunneled EAP Methods", Specification Version 1.0, Revision 3, May 1, 2006 Published, 32 pages.
"TCG Trusted Network Connect TNC IF-TNCCS", Specification Version 1.0, Revision 2, May 1, 2006 Published, 21 pages.
"TCG Trusted Network Connect TNC Architecture for Interoperability", Specification Version 1.1, Revision 2, May 1, 2006 Published, 40 pages.
"TCG Trusted Network Connect TNC IF-IMV", Specification Version 1.1, Revision 5, May 1, 2006 Published, 61 pages.
"TCG Trusted Network Connect TNC IF-IMC", Specification Version 1.1, Revision 5, May 1, 2006 Published, 56 pages.

* cited by examiner

*Primary Examiner* — Brandon Hoffman
*Assistant Examiner* — Anthony Brown
(74) *Attorney, Agent, or Firm* — Harrity & Harrity, LLP

(57) ABSTRACT

A device may include an interface to send authentication information to a plug-in, where the authentication information is related to a client device. The interface may send a policy identifier to the plug-in, where the policy identifier identifies a policy, and may receive a policy result from the plug-in, where the policy result is produced using the authentication information and a policy requirement identified by the policy identifier, and where the policy result identifies whether the client device complies with the policy.

25 Claims, 11 Drawing Sheets

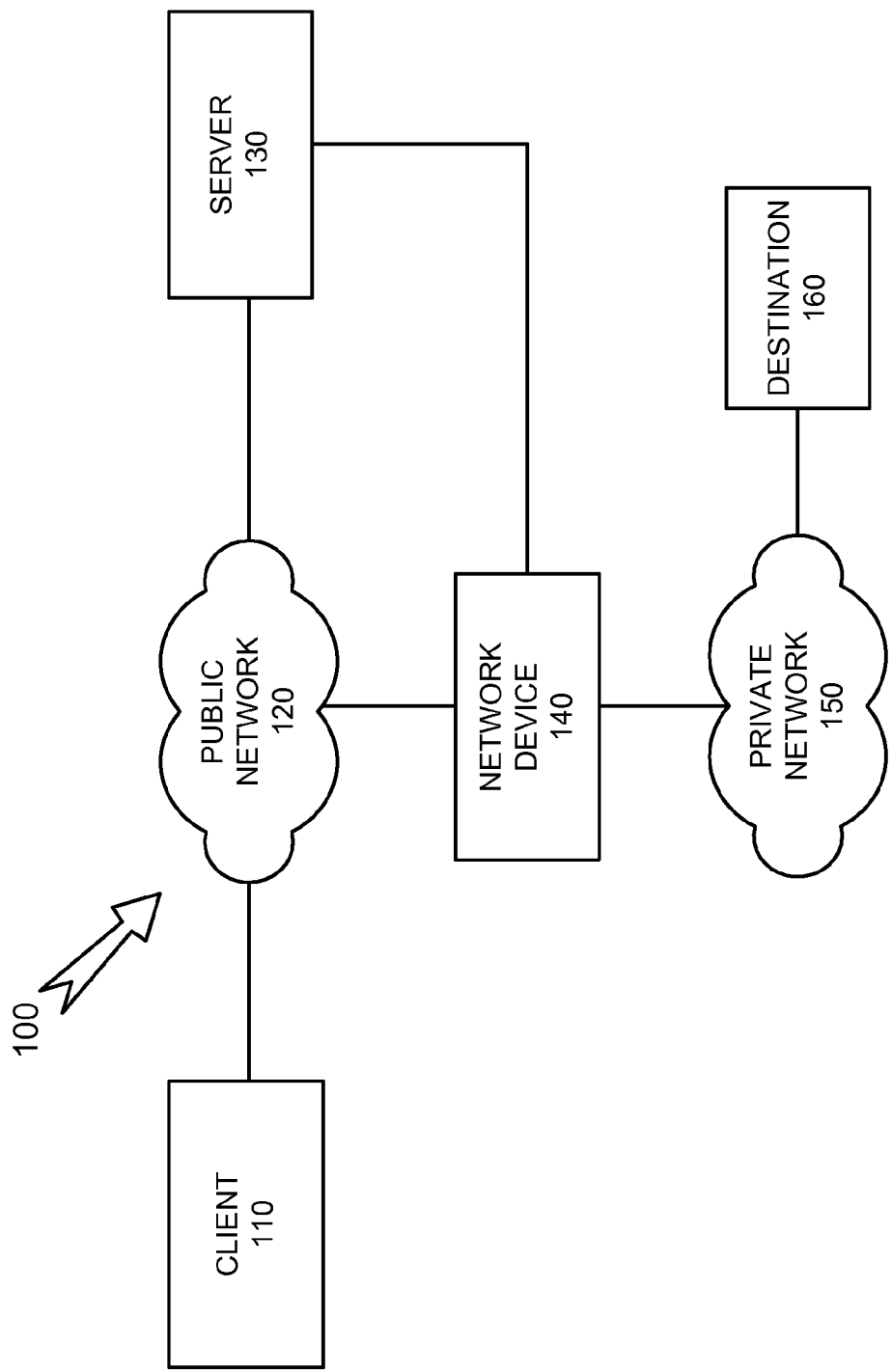

| POLICY ID: ANTIVIRUS | |
|---|---|
| REQUIREMENT ID | STATUS |
| DEFINITIONS | VERSION 3.0 |
| OPERATING STATUS | ON |
| FULL SCAN PERFORMED | YES |
| ELAPSED TIME RE. SCAN | 14 DAYS AGO |
| SCAN STATUS | NO INFECTED FILES |

FIG. 6

| CLIENT ID: BILL SMITH | POLICY ID: ANTIVIRUS |
|---|---|
| POLICY RESULT: FAILED ||
| REQUIREMENT ID | REQUIREMENT RESULT |
| DEFINITIONS | PASSED |
| OPERATING STATUS | FAILED |
| FULL SCAN PERFORMED | PASSED |
| ELAPSED TIME RE. SCAN | FAILED |
| SCAN STATUS | PASSED |
| MISCELLANEOUS ||

FIG. 7

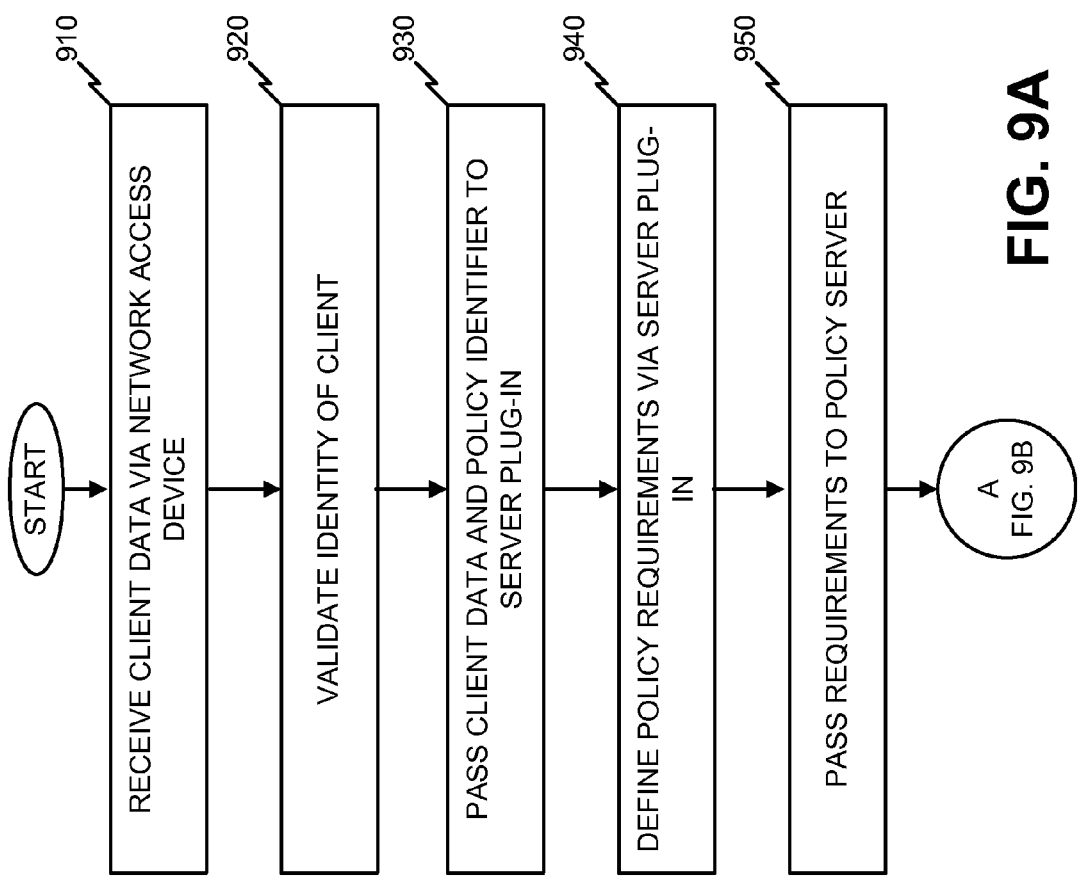

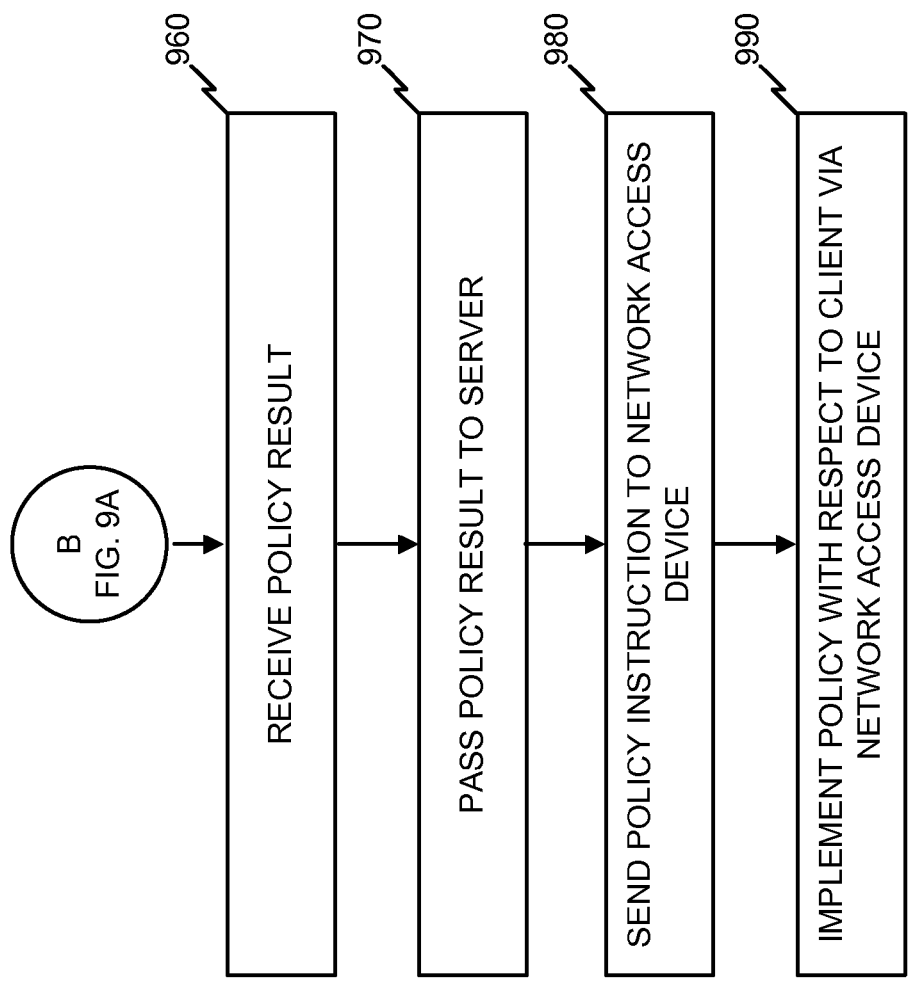

PLUG-IN BASED POLICY EVALUATION

FIELD OF THE INVENTION

Implementations described herein relate generally to computer and data communications and more particularly to techniques for implementing a network policy.

BACKGROUND OF THE INVENTION

Modern data networks may allow a client device to access one or more resources on a network. In certain situations, a client device may attempt to access sensitive resources, such as resources on a corporate network. For example, a client device may attempt to access a file server containing corporate financial data, such as sales records for a company.

Operators of networks containing sensitive information may wish to restrict network access unless devices meet certain requirements. For example, a network operator may not want client devices accessing financial data unless the client devices are protected with antivirus software and are running personal firewall software. The network operator may wish to use a number of different network policies to control access to a number of different resources on a network. Implementing a number of network policies may cause network administration and network policy enforcement to become very complex. As a result, the network operator may not be able to implement a desired number of policies in the network. Failure to implement adequate network policies may allow a client device to access resources that the client device should not be able to access.

Network operators may benefit from techniques that allow network policies to be implemented efficiently.

SUMMARY OF THE INVENTION

In accordance with an aspect, a device is provided. The device may include an interface to send authentication information to a plug-in, where the authentication information is related to a client device. The interface may send a policy identifier to the plug-in, where the policy identifier identifies a policy, and may receive a policy result from the plug-in, where the policy result is produced using the authentication information and a policy requirement identified by the policy identifier, where the policy result identifies whether the client device complies with the policy.

In accordance with another aspect, a server is provided. The server may include an interface to receive authentication information from a network device, where the authentication information is related to a client device, and to send a policy instruction to the network device, where the policy instruction is used by the network device to allow the client device to access a network when the client device complies with a policy. The server may include a plug-in module to parse the authentication information and receive policy information related to the network policy. The plug-in module may send a policy identifier, the authentication information, or the policy information to a policy server, may receive an integrity result from the policy server, where the integrity result identifies whether the client device complies with the policy, and may send the integrity result to the server, where the server uses the integrity result to produce the policy instruction.

In accordance with still another aspect, a plug-in module is provided. The plug-in may include interface logic to receive authentication information related to a client, receive a policy identifier that identifies a policy for the client to be evaluated against, send the policy identifier and authentication information to a policy server so the policy server can perform operations related to identifying whether the client complies with the policy, and receive an integrity result from the policy server, where the integrity result indicates whether the client complies with the policy. The interface logic may send the integrity result to a host device, where the host device uses the integrity result to produce an instruction that is used by a network device to grant or deny access to the client depending on whether the client complies with the policy. The plug-in module may include evaluation logic to parse the authentication information on behalf of the host device so that the authentication information can be used by the policy server when performing operations related to generating the integrity result.

In accordance with yet another aspect, a method is provided. The method may include receiving authentication information from a network device, sending the authentication information to a plug-in module via an application program interface, sending a policy identifier to the plug-in module, where the policy identifier identifies a policy against which a client device is evaluated using a policy server, and receiving a policy result from the plug-in module, where the policy result is determined by the policy server using the authentication information and the policy identifier, and wherein the policy result indicates whether a client device complies with the policy. The method may include sending an enforcement instruction to a network device, where the enforcement instruction causes the network device to connect the client to a resource when the client complies with the policy.

In accordance with yet another aspect, a computer readable medium that stores instructions executable by a processing device is provided. The computer readable medium may include instructions for receiving authentication information, instructions for receiving a policy identifier or a policy requirement related to the authentication information, instructions for parsing the authentication information, instructions for sending the policy identifier or the policy requirement to a policy server, instructions for receiving an integrity result from the policy server, where the integrity result indicates whether a client related to the authentication information complies with a network policy, and instructions for sending the integrity result to a server so the server can instruct a network device with respect to handling communication requests related to the client.

In accordance with still another aspect, a device is provided. The device may include means for receiving authentication information from a network device when a client attempts to access a network; means for sending the authentication information and policy information to a plug-in module; means for receiving an integrity result from the plug-in, where the integrity result is produced by a policy server connected to the plug-in where the policy server operates on the authentication information, the policy information and one or more policy requirements to produce the integrity result, and wherein the integrity result indicates whether the client complies with a policy; and means for sending a policy enforcement instruction to the network device, where the policy enforcement instruction is adapted to cause the network device to connect the client to a desired destination when the client complies with the policy or to cause the network device to quarantine the client when the client does not comply with the policy.

BRIEF DESCRIPTION OF THE DRAWINGS

The accompanying drawings, which are incorporated in and constitute a part of this specification, illustrate one or more embodiments of the invention and, together with the description, explain the invention. In the drawings, FIG. 1A illustrates an exemplary system that can be configured to operate in accordance with principles of the invention;

FIG. 6 illustrates an exemplary data structure that can be used by a server plug-in module when performing policy related operations on behalf of a server;

FIG. 7 illustrates an exemplary data structure that can be used to send an integrity result to a device;

FIGS. 9A and 9B illustrate exemplary processing to evaluate and implement a network policy.

DETAILED DESCRIPTION

Figure 1B:
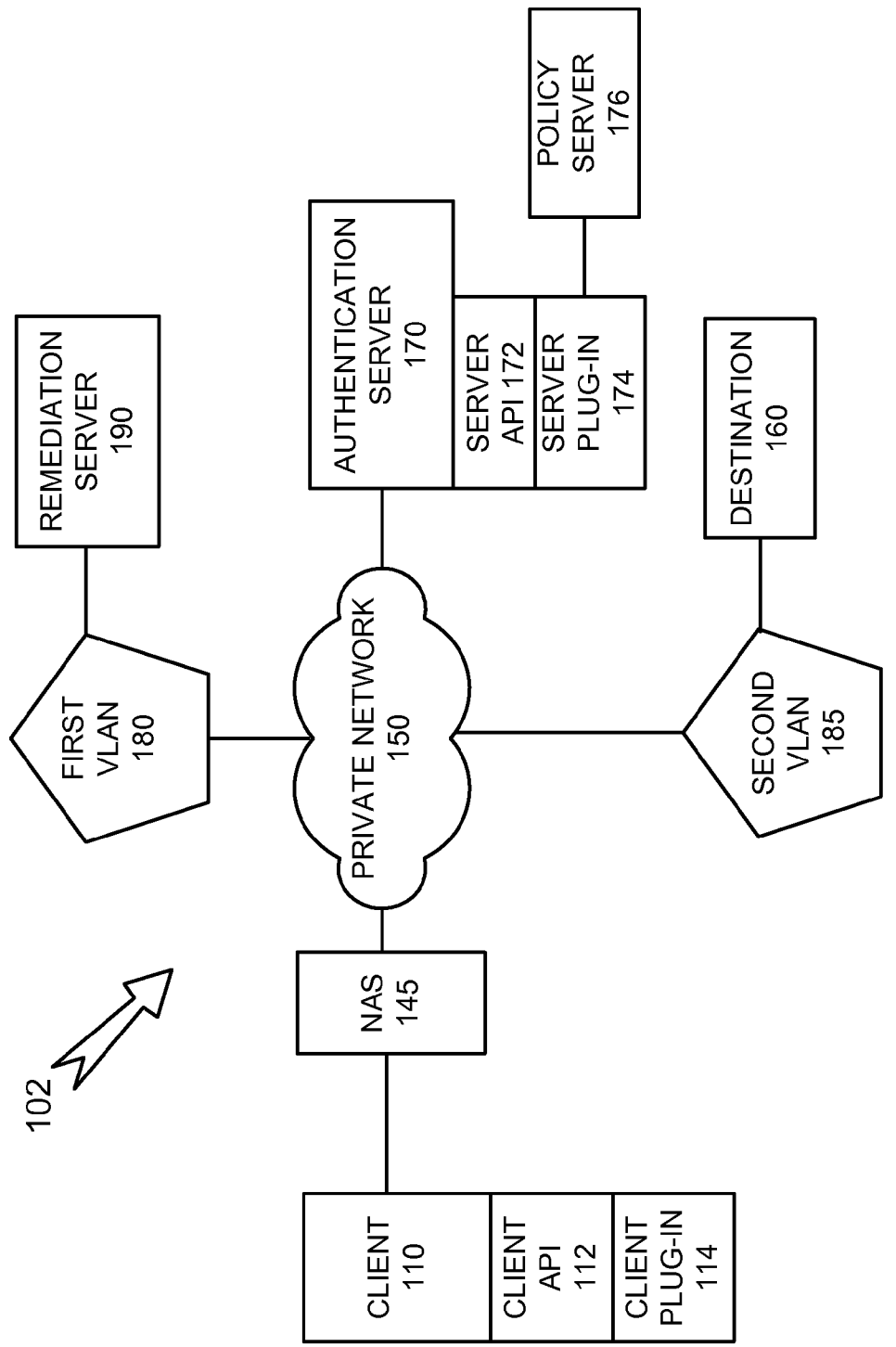
FIG. 1B illustrates an exemplary system that uses a network access device (NAS) and authentication server to operate in accordance with principles of the invention.

The following detailed description refers to the accompanying drawings. The same reference numbers in different drawings may identify the same or similar elements. Also, the following detailed description does not limit the invention. Instead, the scope of the invention is defined by the appended claims and their equivalents.

Implementations may include a server, such as an authentication server, operating as a policy decision point to make determinations with respect to a network policy that can be implemented with respect to one or more client devices, or endpoints. "Policy," as used herein, refers to any set of rules or instructions that can be used to alter the operation of a device or network. For example, a policy can be used to prevent a client device from accessing other devices, such as destination devices, unless the client device complies with the policy. Policies can be used to determine the health, or status, of a device, such as by determining whether a device is running a certain version of hardware or software.

The authentication server may use plug-in modules to perform processing operations with respect to a network policy. The authentication server may receive client information from a network device, such as a network access device (NAS), and may pass the client information to a plug-in module via an application program interface (API). The plug-in module may parse the client information to identify the client and to associate the client with a policy requirement. The plug-in may map the policy requirement to a named policy by itself or by communicating with a policy server. In one implementation, the plug-in may receive a policy decision from the policy server and may pass the policy decision to the authentication server via the API so that the authentication server can instruct the NAS with respect to the client. For example, the policy decision may indicate that the client complies with the network policy. The authentication server may process this policy decision and may instruct the NAS to connect the client to a corporate network so that the client can access corporate data. In contrast, the plug-in may produce a policy decision that determines that the client should be quarantined because the client does not comply with a network policy. For example, the client may be running out-of-date antivirus definitions which may violate the network policy. The authentication server may receive a policy decision from the plug-in indicating that the client does not comply with the network policy and that the client should be quarantined. The authentication server may generate an enforcement instruction and may send the enforcement instruction to the NAS. The NAS may connect the client to a quarantine site that allows the client to download information that can be used to make the client compliant with the network policy. The client may be allowed to access the corporate network after becoming compliant with the network policy.

Implementations described herein may operate with substantially any number of client devices, servers, server evaluation modules and/or network devices to implement substantially any number of network policies.

Exemplary System

FIG. 1A illustrates an exemplary system 100 that can be configured to operate in accordance with principles of the invention. System 100 may include a client 110, a public network 120, a server 130, a network device 140, a private network 150, and a destination 160.

Client 110 may include a device capable of making a data unit available to a network. "Data unit," as used herein, may refer to any type of machine-readable data having substantially any format that may be adapted for use in one or more networks, such as public network 120 and/or private network 150. A data unit may include packet data and/or non-packet data. A data unit may include any type of encapsulated data, such as, for example, packets, cells, datagrams, fragments of packets, or fragments of datagrams or cells. Client 110 may include a computer, such as a desktop computer, a laptop computer, a client, a server, a personal digital assistant (PDA), a web-enabled cellular telephone, or another computation or communication device. In one implementation, client 110 may operate as a client device, or endpoint, and may attempt to access resources on private network 150, such as destination 160. Implementations of client 110 may use plug-in modules to make determinations with respect to client 110, network 120, server 130, etc. For example, client 110 may run a plug-in that provides information about antivirus definitions loaded onto client 110.

Public network 120 may include any network capable of transferring a data unit. Implementations of public network 120 may include local area networks (LANs), metropolitan area networks (MANs) and/or wide area networks (WANs), such as the Internet, that may operate using substantially any network protocol, such as Internet protocol (IP), asynchronous transfer mode (ATM), and/or synchronous optical network (SONET). Public network 120 may include network devices, such as routers, switches, firewalls, and/or servers (not shown). Public network 120 may be a hardwired network using wired conductors and/or optical fibers and/or may be a wireless network using free-space optical and/or radio frequency (RF) transmission paths. Implementations of networks and/or devices operating on networks described herein are not limited to any particular data type, and/or protocol.

Server 130 may include a device capable of receiving a data unit from, and transmitting a data unit to, another device and/or network. For example, server 130 may include a workstation, desktop computer, laptop computer, PDA, web enabled cellular telephone, Wi-Fi device, or another type of device. In one implementation, server 130 may provide a service to other devices in system 100, such as client 110 and/or destination 160. Server 130 may be configured to operate as an endpoint integrity server and may use one or more plug-in modules to implement substantially any number of network policies. For example, server 130 may use an antivirus plug-in to implement an antivirus policy and operating system plug-in to determine whether client 110 is running a compliant version of an operating system.

Network device 140 may include a device capable of receiving a data unit via a network. In one implementation, network device 140 may include an in-line device operating as an edge device between a first network and a destination device that may be operating on a second network. For example, network device 140 may operate as an edge device between an untrusted network, such as the Internet (e.g., public network 120), and a trusted network, such as a corporate LAN (e.g., private network 150). "Inline network device" may refer to any network device operating in a manner whereby all, or substantially all, data units intended for a destination device pass through the network device before reaching the destination device.

Network device 140 may include one or more devices such as NASs, routers, gateways, firewalls, switches, and/or servers. For example, network device 140 may operate as a router in cooperation with server 130 to provide communication services to a number of subscribers, such as client 110 and/or destination 160. In one implementation, server 130 may operate as a policy decision point and may determine whether client 110 complies with a network policy, such as a network policy for private network 150. Server 130 may communicate network policy information, such as policy enforcement instructions, to network device 140. Network device 140 may operate as a policy enforcement point on behalf of server 130 by allowing client 110 to access resources on private network 150 when client 110 is authorized to do so according to a network policy administered by server 130.

Private network 150 may include any network capable of transporting a data unit. Private network 150 may, for example, be a secure network such as a LAN associated with a corporation. Private network 150 may be configured so that all, or substantially all, data units intended for a device operating on private network 150 pass through network device 140. For example, network device 140 may operate to prevent data units from reaching a protected device, such as destination device 160, unless a sending device is authorized to send data units to destination 160 according to a network policy administered by server 130. Private network 150 may be a wired network or a wireless network.

Destination 160 may include a device capable of making a data unit available to a network or capable of receiving a data unit from a network. Destination 160 may include a computer, such as a desktop computer, a laptop computer, a client, a server, a personal digital assistant (PDA), a web-enabled cellular telephone, or another computation or communication device. Access to destination 160 may be controlled via a network policy administered via server 130 and/or enforced by network device 140. A sending device may be allowed to exchange information with destination 160 when the sending device complies with a network policy related to destination 160. Implementations of destination device 160 may be configured to operate on private network 150 without having to know about network policies administered by server 130 and/or network device 140.

FIG. 1B illustrates an exemplary system 102 that includes a NAS and authentication server to implement a network policy. System 102 may include client 110, NAS 145, private network 150, destination 160, authentication server 170, policy server 176, first virtual local area network (VLAN) 180, second VLAN 185, and remediation server 190.

Client 110 may be similar to client 110 of FIG. 1A and may include a client application program interface (API) 112 and a client plug-in 114. API 112 may include hardware or software based logic to communicate with plug-in 114 on behalf of client 110. For example, implementations of API 112 may initialize or terminate plug-in 114, provide an authentication notification to plug-in 114 (e.g., inform plug-in 114 that an authentication is in progress), provide network adapter information to plug-in 114 (e.g., adapter name, adapter status, adapter address, interface type (e.g., wired or wireless), secure socket identifier (SSID), etc.), provide plug-in 114 with the ability to work at determined intervals (e.g., hourly or when an event occurs), allow plug-in 114 to send attribute value pairs (AVPs) and/or type length and value (TLV) data via a secure tunnel, provide completion verification to plug-in 114 (e.g., allow client 110 to verify a completion status of plug-in 114), provide a logging capability to plug-in 114, allow plug-in 114 to make queries for user identity information (e.g., user identity information associated with a log in and/or authentication), receive an error message from plug-in 114 (e.g., to receive an error generated by plug-in 114 as a result of a failed authentication), to provide a pseudo random number generation capability on behalf of plug-in 114, etc.

Plug-in 114 may include self-contained logic adapted to perform an operation on behalf of client 110. For example, plug-in 114 may include code that is adapted to be loaded onto a host device such as client 110, to perform an operation. Plug-in 114 may perform operations on behalf of client 110, such as determining whether client 110 is connected to a network, determining what hardware and/or software configurations are running on client 110, determining whether client 110 has performed an operation, such as an antivirus scan or disk integrity scan, etc. Plug-in 114 may further make information about client 110 available to other devices in system 102.

Private network 150 may be similar to private network 150 in FIG. 1A. NAS 145 may include a device that allows client 110 to access private network 150 and/or access resources on private network 150, such as destination 160. NAS 145 may provide access to substantially any number of clients 110 via a wired and/or wireless connection. In one implementation, NAS 145 may connect to client 110 via an 802.1x wireless link.

NAS 145 may receive authentication information from client 110 and may pass the authentication information to another device, such as authentication server 170. NAS 145 may receive an authentication result from authentication server 170 and may provide client 110 with access to a portion of private network 150, such as first VLAN 180 and/or second VLAN 185, based on the authentication result. NAS 145 may further receive a policy instruction from a device (e.g., authentication server 170, policy server 176, and/or another device), where the policy instruction identifies whether client 110 complies with a network policy (e.g., a network access policy) related to private network 150. NAS 145 may allow client 110 to connect to private network 150 when the policy instruction indicates that client 110 complies with a policy.

Authentication server 170 may include a device that performs authentication on behalf of one or more clients and/or other devices (e.g., NAS 145, destination 160, etc.). For example, authentication server 170 may receive a user name and password from NAS 145, where the user name and password are related to client 110. Authentication server 170 may access a database and may determine whether the user name and password are valid. Client 110 may be allowed to participate in policy related activities, such as by having its compliance determined, when the user name and password are valid. In one implementation, authentication server 170 may be implemented as a remote authentication dial-in user service (RADIUS) server.

Authentication server 170 may include server API 172 and server plug-in 174. API 172 may include hardware or software based logic to send information to plug-in 174 and/or to receive information from plug-in 174. API 172 may include machine-executable instructions that send information to and/or receive information from applications, such as software modules. API 172 may pass attribute value pairs (AVPs) to plug-in 174, may define policy requirements on behalf of plug-in 174, etc. In one implementation, API 172 may provide functionality to plug-in 174, such as initialization and/or termination of plug-in 174, authentication notification (i.e., provide an indication to plug-in 174 that authentication is in progress), sending and receiving AVPs and TLVs via a secure channel, and completion verification (i.e., allows authentication server 170 to verify the completion status of plug-in 174). The implementation may further provide functionality that includes identification of authentication status (allows authentication server 170 to indicate status of an authentication to plug-in 174), attribute handling (i.e., allows plug-in 174 to receive attribute requests related to a client request and to provide attributes related to a response), and access to implementations of a Java virtual machine operating on authentication server 170. The implementation may also provide functionality that includes logging (i.e., allows plug-in 174 to provide logging information), identification of address/port information (i.e., allows plug-in 174 to obtain address/port information for authentication server 170 on which plug-in 174 is running), and pseudo random number generation, user information (i.e., provides plug-in 174 with the ability to query authentication server 170 for user information related to client 110). The implementation may still further provide functionality that includes error generation (i.e., allows plug-in 174 to generate errors to identify a failed authentication, such as a RADIUS authentication), session management (i.e., allows plug-in 174 to obtain and/or set information related to a secure tunnel ID, session resumed status, session time out values, etc.), get/set policy information (i.e., allows plug-in 174 to set and obtain various policies associated with the user/session), etc.

Plug-in 174 may be implemented as an extensible plug-in module in authentication server 170. A plug-in module may include self-contained logic adapted to perform an operation on behalf of a host device (e.g., authentication server 170). A plug-in module may be configured to be moveable from one host device to another host device without requiring substantial modifications to the receiving host device in order to host and/or interact with the plug-in module. An extensible plug-in module may be adaptively sized or scaled to accommodate requirements related to a network policy. Implementations of plug-in 174 may reside locally on authentication server 170. Plug-in 174 may include logic to parse information received from API 172, to process information on behalf of server 170 or policy server 176 and/or to exchange information with policy server 176. For example, plug-in 174 may operate with policy server 176 to produce a policy decision that may determine that client 110 complies with a network policy, that client 110 does not comply with a network policy, that client 110 should be quarantined, etc. Server 170 may process the policy decision and may determine whether to send a policy enforcement instruction to NAS 145 based on the policy decision received from plug-in 174.

Policy server 176 may include a device that provides policy requirements and/or a result, such as an integrity result, related to a network policy. Policy server 176 may receive policy related information from plug-in 174 and may make a determination with respect to a network policy based on the received information. For example, policy server 176 may determine whether client 110 complies with an antivirus policy based on information received from plug-in 174. Policy server 176 may process the information on behalf of plug-in 174 and/or may provide information to plug-in 174 so that plug-in 174 can perform the processing. For example, policy server 176 may provide plug-in 174 with an integrity result when processing is performed by policy server 176 on behalf of plug-in 174. Plug-in 174 may make the integrity result available to server 170 via API 172 so that server 170 can provide a policy instruction to NAS 145 based on the integrity result. NAS 145 may provide client 110 with access to second VLAN 185 and/or first VLAN 180 based on the policy instruction.

First VLAN 180 and second VLAN 185 may include portions of private network 150 and/or portions of other networks. First VLAN 180 may include a portion of private network 150 that non-compliant clients 110 may be connected to in order to provide non-compliant clients 110 with remediation information that can be used to bring non-compliant clients 110 into compliance with a network policy. Second VLAN 185 may include portions of private network 150 that may be made available to clients 110 that are in compliance with a network policy.

Remediation server 190 may include a device that provides non-compliant clients 110 with information that can be used to bring non-compliant clients 110 into compliance with a network policy.

Exemplary Device Architecture

Figure 2:
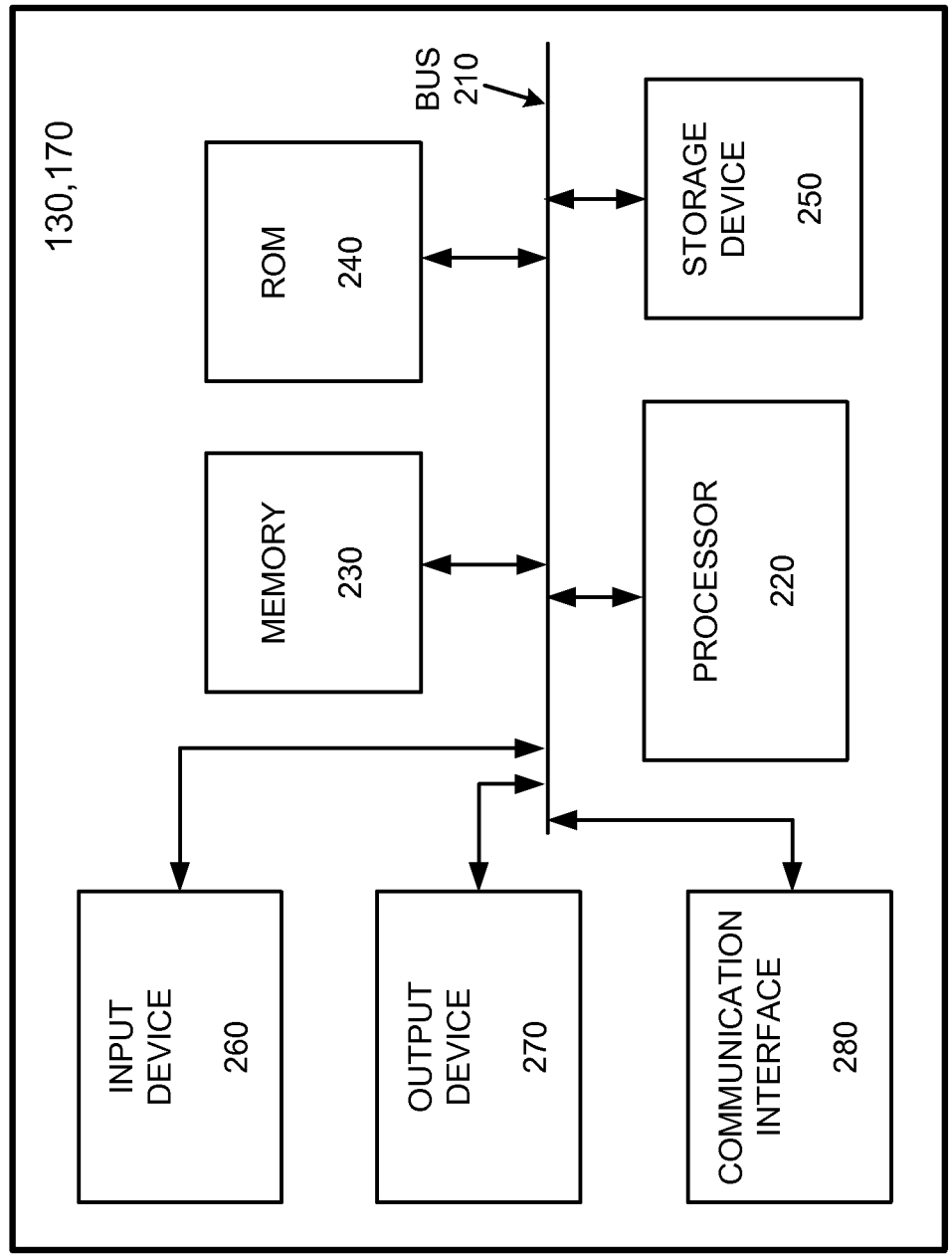
FIG. 2 illustrates an exemplary architecture for implementing the server device of FIGS. 1A and 1B.

FIG. 2 illustrates an exemplary architecture for implementing servers 130 or 170 of FIGS. 1A and 1B, respectively. It will be appreciated that client 110, network device 140, NAS 145, destination 160, policy server 176, remediation server 190, and/or other devices in system 100/102 (FIG. 1B) may be similarly configured. As illustrated in FIG. 2, server 130/170 may include a bus 210, a processor 220, a memory 230, a read only memory (ROM) 240, a storage device 250, an input device 260, an output device 270, and a communication interface 280.

Bus 210 may include one or more interconnects that permit communication among the components of server 130/170. Processor 220 may include any type of processor, microprocessor, or processing logic that may interpret and execute instructions. Memory 230 may include a random access memory (RAM) or another type of dynamic storage device that may store information and instructions for execution by processor 220. Memory 230 may also be used to store temporary variables or other intermediate information during execution of instructions by processor 220.

ROM 240 may include a ROM device and/or another type of static storage device that may store static information and instructions for processor 220. Storage device 250 may include a magnetic disk and/or optical disk and its corresponding drive for storing information and/or instructions.

Input device 260 may include any mechanism or combination of mechanisms that permit an operator to input information to server 130/170, such as a keyboard, a mouse, a microphone, a pen-based pointing device, and/or a biometric input device, such as a voice recognition device and/or a finger print scanning device. Output device 270 may include any mechanism or combination of mechanisms that outputs information to the operator, including a display, a printer, a speaker, etc.

Communication interface 280 may include any transceiver-like mechanism that enables server 130/170 to communicate with other devices and/or systems, such as client 110 or network device 140/NAS 145. For example, communication interface 280 may include one or more interfaces, such as a first interface coupled to public network 120 and/or a second interface coupled to private network 150. Alternatively, communication interface 280 may include other mechanisms for communicating via a network, such as private network 150 and/or public network 120.

Server 130/170 may perform certain functions in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features described herein. Thus, implementations described herein are not limited to any specific combination of hardware circuitry and software.

Exemplary Server Functional Diagram

Figure 3:
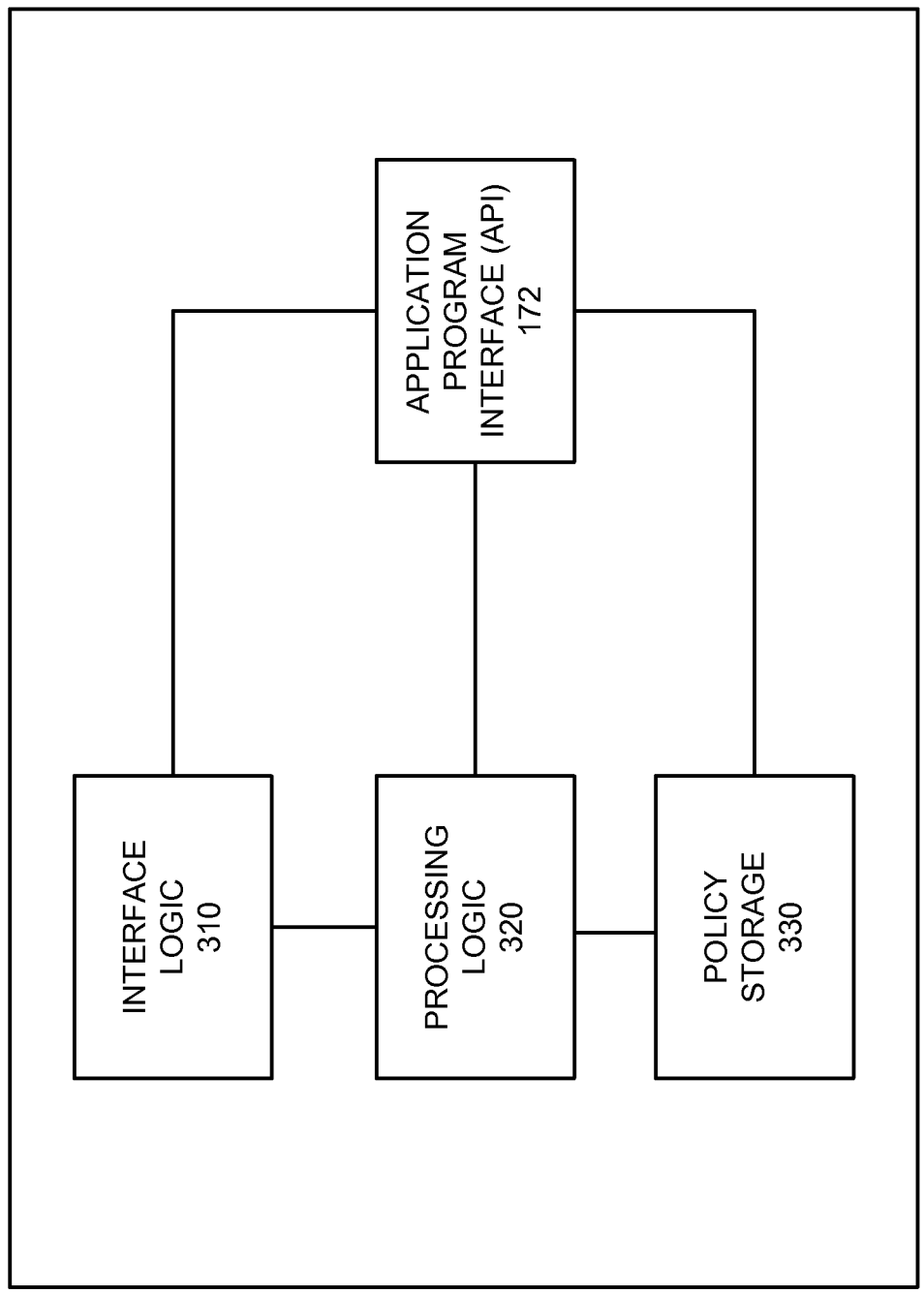
FIG. 3 illustrates an exemplary functional diagram of the server of FIG. 2.

FIG. 3 illustrates an exemplary functional diagram of server 170. The functional diagram of FIG. 3 may include API 172, interface logic 310, processing logic 320, and policy storage 330. The implementation of FIG. 3 is exemplary, and server 170 may include more or fewer functional components without departing from the spirit of the invention. Implementations of server 130 (FIG. 1A) may also include the functional logic illustrated in FIG. 3. API 172 may operate as described in connection with FIG. 1B.

Interface logic 310 may include hardware or software to send or receive information to/from a destination. In one implementation, interface logic 310 may send a request for compliance measurements to client 110 and may receive a response from client 110. In another implementation, interface logic 310 may send enforcement instructions to NAS 145. Interface logic 310 may be implemented in communication interface 280 or elsewhere in server 170.

Processing logic 320 may include hardware or software to process instructions or data related to operations performed by server 170. For example, processing logic 320 may be implemented in processor 220 and may operate on authentication information received from client 110 to extract information therein. Processing logic 320 may make processed information available to another device, software module, or component operating in server 170.

Policy storage 330 may include hardware or software logic to store information related to network policies. For example, server 170 may store information, such as a policy identifier, related to an antivirus policy or a network security policy in policy storage 330. An antivirus policy may be used restrict access to destination 160 unless a sending device complies with the antivirus policy, such as by running a certain version of antivirus software or by having certain virus definitions loaded thereon. Server 170 may send antivirus information (e.g., an antivirus policy identifier) to a plug-in, such as plug-in 174, so the plug-in can determine whether the sending device (e.g., client 110) complies with the antivirus policy.

Exemplary Plug-In Module Functional Diagram

Figure 4:
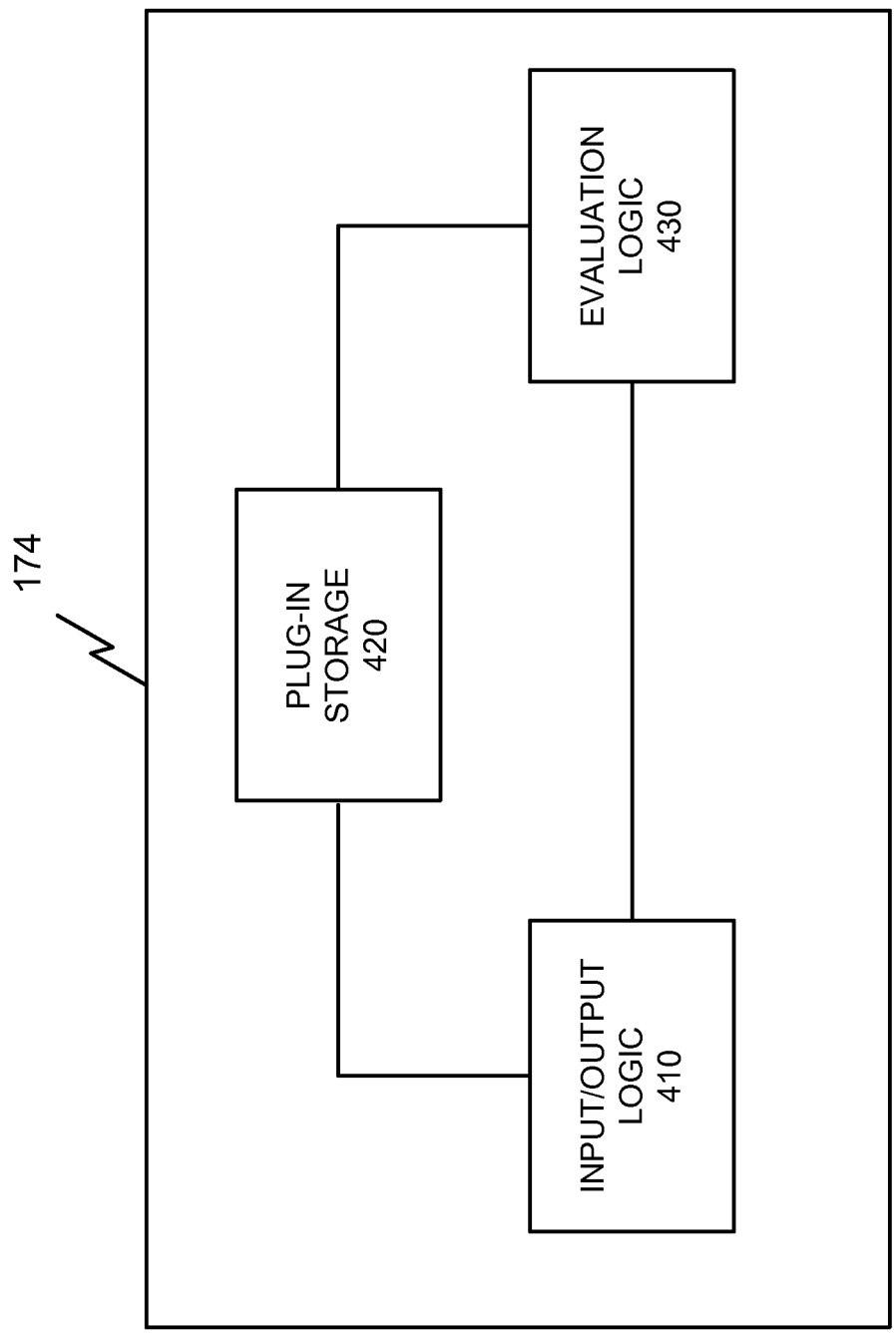
FIG. 4 illustrates an exemplary functional diagram of a server plug-in module.

FIG. 4 illustrates an exemplary functional diagram of server plug-in module 174. Plug-in 174 may include input/output (I/O) logic 410, plug-in storage 420, and evaluation logic 430. I/O logic 410 may include hardware or software to receive information from server 170 or to send information to server 170. For example, I/O logic 410 may receive client measurements, policy identifiers (IDs), and/or policy requirements from server 170 via API 172. I/O logic 410 may send client measurements and/or other information to policy server 176 so that policy server 176 can determine an integrity result with respect to client 110. In one implementation, I/O logic 410 may interact with API 172 to exchange information with server 170 and in other implementations, I/O logic 410 may interact with server 170 without using API 172. I/O logic 410 may send policy compliance results, policy instructions, etc., to server 170.

Plug-in storage 420 may include hardware or software logic to store a network policy, network policy identifiers, network policy parameters, network policy results, and/or other information that can be used by plug-in 174 when determining policy requirements and/or producing policy compliance results, such as an integrity result on behalf of client 110. Plug-in storage 420 may reside locally with plug-in 174 and/or may reside elsewhere, such as in memory 230 or in another device in system 102. In one implementation, plug-in storage 420 may include a database containing information about a network policy, such as policy requirements.

Evaluation logic 430 may include hardware or software that performs operations on information received from server 170 and/or policy server 176. For example, server 170 may receive measurement data from client 110. Server 170 may forward the measurement data, a policy identifier (e.g., a policy name), and/or policy contents to plug-in 174. Evaluation logic 430 may map policy requirements to a policy and may process the measurement data using the policy requirements, policy contents, and/or other policy related information in plug-in storage 420. For example, evaluation logic 430 may receive client AVPs from API 172. Evaluation logic 430 may parse the AVPs and may provide extracted contents (e.g., a user name and password) to policy server 176 via I/O logic 410. Plug-in 174 may determine the compliance of client 110 with respect to a network policy via evaluation logic 430 when processing is performed on server 170. Evaluation logic 430 may reside locally in plug-in 174 or may reside elsewhere in server 170, such as in processor 220, or elsewhere in system 102.

Exemplary Data Structure

Figure 5:
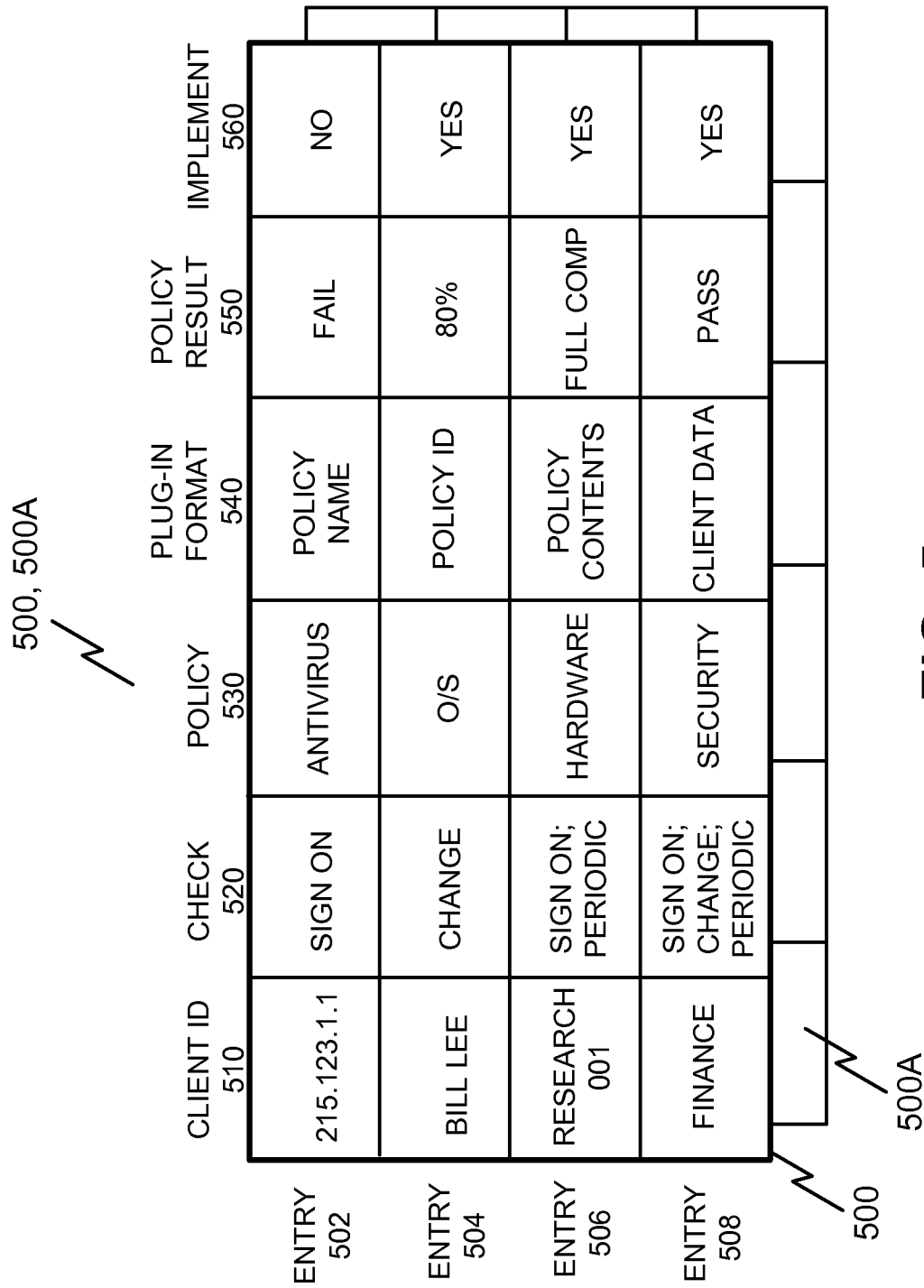
FIG. 5 illustrates an exemplary data structure for storing network policy information.

FIG. 5 illustrates an exemplary data structure 500 for storing network policy information. Data structure 500 may be implemented via a computer-readable medium that can be used to store information in a machine-readable format. In an exemplary implementation, data structure 500 may be implemented as a table that may include information that identifies client 110, network policies, data formats, network policy test results, and network status details related to the implementation of a network policy. In one implementation, data structure 500 may be implemented in server 170 via memory 230 or via storage device 250.

Data structure 500 may include information arranged in fields, such as client ID field 510, check field 520, policy field 530, plug-in format field 540, policy result field 550, and implement field 560. Information stored in data structure 500 may be arranged in a row and column format to facilitate interpretation by a user of server 170 and/or processing logic 320. Entries 502-508 may be used to identify information associated with client ID field 510, check field 520, policy field 530, plug-in format field 540, policy result field 550, and implement field 560. Implementations of server 170 may include one or more data structures, such as data structure 500 and 500A. Data structure 500A may include similar or the same fields as data structure 500. For example, data structure 500 may include information related to an antivirus policy for a group of users and/or an antivirus plug-in 174 and data structure 500A may include information related to a security policy for a group of users and/or a security plug-in 174.

Client ID 510 may include information that identifies client 110 or a user of client 110. For example, client ID 510 may include an internet protocol address, a group or department name, a geographic location identifier, such as a room number or street address, a user's name, user's social security number, etc.

Check 520 may include information to indicate when the compliance of client 110 should be determined. For example, "sign on" may indicate that the compliance, or health, of client 110 should be checked when client 110 attempts to sign on, or log into, a network. "Change" may indicate that the compliance of client 110 should be checked when there is a change in the network or a determined parameter related to the network. For example, the compliance of client 110 may be checked when a device on a network goes down or when malicious data units are detected in the network. "Periodic" may indicate that the compliance of client 110 should be checked periodically, such as at determined intervals, while client 110 is connected to the network. The status of client 110 may also be checked at other times or during other events. For example, a compliance check of client 110 may be triggered when client 110 attempts to access a certain resource, such as destination 160.

Policy 530 may include information that identifies a network policy related to client 110. For example, policy 530 may indicate that client 110 should be evaluated with respect to an antivirus policy, an operating system (O/S) policy, a security policy, a special policy, etc. A special policy may include a policy that is related to a certain destination, such as a device containing sensitive information. In other implementations, a special policy may include other types of information.

Plug-in format 540 may include information that identifies a format for client device related information that is sent from server 170 to plug-in 174. For example, server 170 may send a policy name to plug-in 174 for a client 110 in entry 502, a policy ID and policy requirements for a client 110 in entry 504, and client data for a client 110 in entry 508. Information in plug-in format 540 may be in substantially any form.

Policy result 550 may include information that identifies a result produced by plug-in 174 and/or policy server 176. A result produced by plug-in 174/policy server 176 may include information that can be used to determine the compliance of client 110 with respect to a network policy. Policy result 550 may be represented in substantially any form. For example, a result can be provided as a "pass" or "fail" entry, on a graduated scale, such as 4 out of a possible 5, as a percentage, or as another form, such as fully compliant, partially compliant, satisfactory, etc. Policy result 550 may also include a link or address that references a file or another data structure that includes result information related to client 110.

Implement 560 may include information that identifies whether a policy related to client 110 has been implemented with respect to client 110. For example, server 170 may send a policy ID and client 110 measurements to plug-in 174. Plug-in 174 may process the measurements in cooperation with policy server 176 based on the policy ID and may return an integrity result. Server 170 may generate a policy instruction based on the integrity result and may send the policy instruction to NAS 145 so that NAS 145 can enforce the policy with respect to client 110. Implement field 560 may include "yes" when result 550 has been accepted by NAS 145 and may include "no" when result 550 has not been accepted by NAS 145.

Exemplary Server Plug-In Module Data Structures

FIG. 6 illustrates an exemplary data structure 600 that can be used by plug-in 174 when performing policy related operations on behalf of server 170. Data structure 600 may be implemented via a computer-readable medium that can be used to store information in a machine-readable format. In an exemplary implementation, data structure 600 may be implemented as a table that may include information that identifies client 110, and/or a policy, policy requirements, and/or status information related to the policy requirements. Implementations of plug-in 174 may include substantially any number of data structures 600. Data structure 600 may be stored in plug-in 174 or may be stored elsewhere, such as in memory 230.

Data structure 600 may include policy ID field 610, requirement ID 620 and status field 630. Policy ID 610 may include information that identifies a policy that is related to the content of data structure 600. For example, an implementation of data structure 600 may include "antivirus" in policy ID 610 when data structure 600 includes information about a policy related to antivirus software running on client 110.

Requirement ID 620 may include information related to one or more requirements that are related to a policy identified in policy ID 610. One or more requirements may need to be satisfied in order for a device, such as client 110, to be identified as complying with a policy identified via policy ID 610. For example, an antivirus policy may include a definitions entry, an operating status entry, a full scan indicator, an elapsed time entry, and a scan status entry.

Status 630 may include information related to items in requirements 620. For example, "definitions" may be designated "version 3.0" to indicate that client 110 is running version 3.0 of antivirus definitions, "operating status" may be designated "on" to indicate that the antivirus program is turned on, "full scan performed" may be designated "yes" to indicate that a full system scan has been performed on client 110, "elapsed time re. scan" may be designated "14 days ago" to indicate that the full system scan was performed 14 days prior to performing the compliance check with respect to client 110, and "scan status" may be designated "no infected files" to indicate that no infected files were located on client 110 when the last full system scan was performed using the antivirus application.

FIG. 7 illustrates an exemplary data structure 700 that can be used to send an integrity result to plug-in 174 and/or to a device. In one implementation, data structure 700 may reside in plug-in 174 and plug-in 174 may populate data structure 700 with information received from server 170 and/or policy server 176. In another implementation, policy server 176 may populate data structure 700 and may send data structure 700 to plug-in 174 as an integrity result.

Data structure 700 may include policy ID field 610, requirement ID 620, client ID field 710, policy result field 720, requirement results field 730 and miscellaneous field 740. Policy ID 610 and requirements ID 620 may be implemented as described in conjunction with FIG. 6 above.

Client ID 710 may identify a client 110 for which plug-in 174 evaluated a policy. For example, server 170 may have queried plug-in 174 to evaluate a client device used by Bill Smith for compliance with an antivirus policy. Plug-in 174 may map the antivirus policy to a number of antivirus related requirements that collectively make up the antivirus policy. Plug-in 174 may send the requirements to policy server 176 and policy server 176 may produce a result (e.g., an integrity result) for the policy. The integrity result may include a pass or fail indicator for respective requirements making up the antivirus policy. Policy server 176 may send the integrity result and/or requirement results 730 to plug-in 174. Plug-in 174 may provide server 170 with result information for the policy that was evaluated on behalf of client 110 (Bill Smith).

Policy result 720 may include information that identifies a compliance result for the policy identified in policy ID 610. Plug-in 174, alone or in cooperation with policy server 176, may process entries in requirement ID 620 to determine a value for policy result 720. For example, plug-in 174 may use logical operators, e.g. AND, OR, NOR, etc., to compare two or more requirements results 730 that are related to a policy identified in policy ID 610. Plug-in 174 may determine a final result based on the comparison and may place the result in policy result 720. For example, client 110 may be running a proper version of antivirus definitions and may receive a "passed" value in requirements result 730. In contrast, client 110 may receive a "failed" value for operating status since client 110 may not have the antivirus program turned on. Policy result 720 may be formed by performing an AND operation across entries in requirement results 730 so that a policy result 720 of "failed" will occur unless all entries in requirements results 730 include "passed" values. Policy result 720 may include substantially any type of information, such as passed, failed, 90% compliant, two out of three, etc.

Requirements result 730 may include information that identifies whether a corresponding entry in requirement ID 620 meets determined criteria. For example, an integrity policy may require that client 110 have antivirus definitions with a version number of 2.9 or greater. Since client 110 has version 3.0, requirement result 730 for definitions may be populated with "passed."

Miscellaneous field 740 may include other types of information related to client 110, plug-in 174, policy server 176, and/or other devices in systems 100/102. Miscellaneous field 740 may also include information about other fields in data structures 500, 600 and/or 700.

Exemplary Message Exchange

Figure 8:
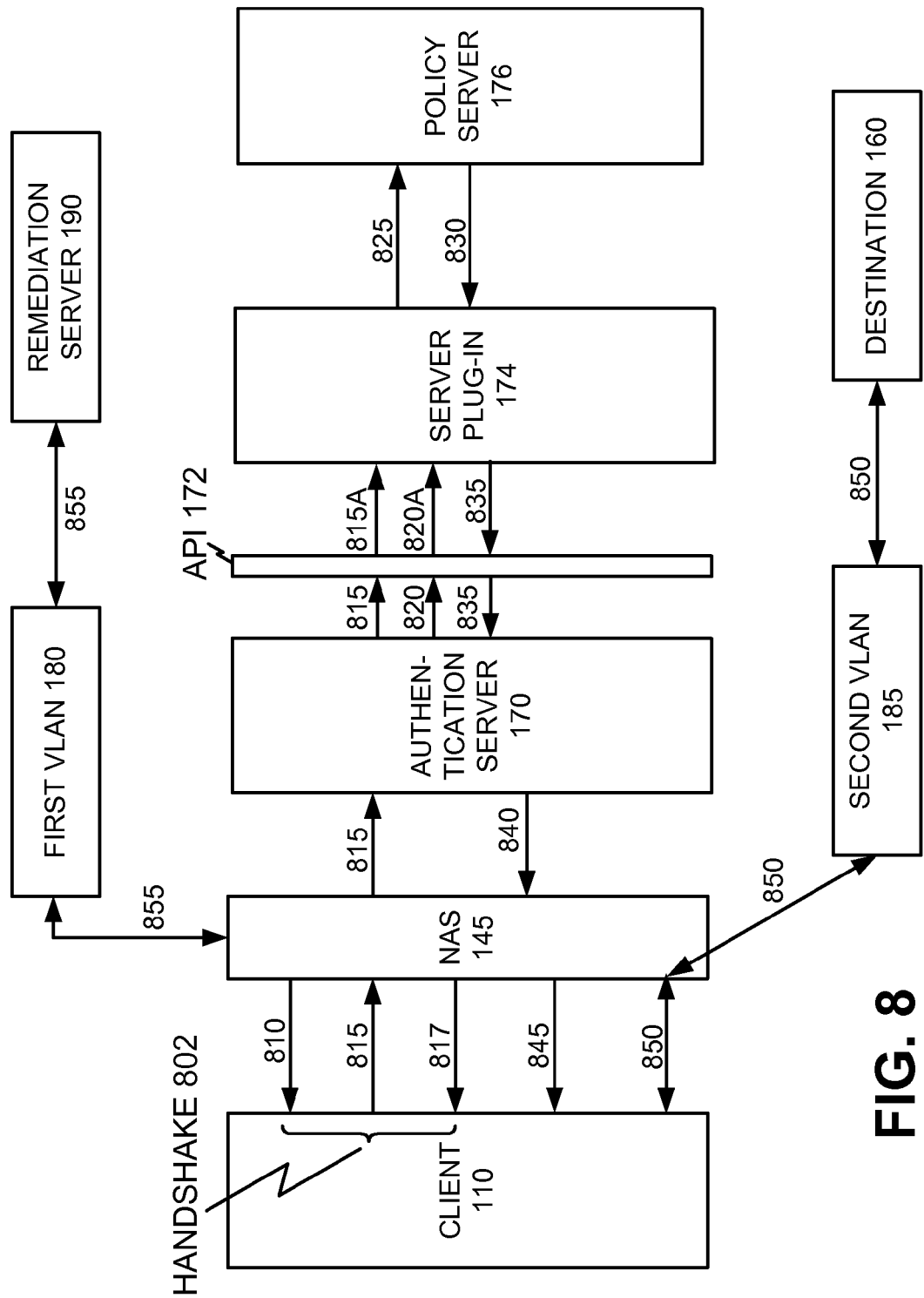
FIG. 8 illustrates exemplary messages that can be exchanged between devices to implement a network policy.

FIG. 8 illustrates exemplary messages that can be exchanged between devices of system 102 to implement a network policy. Other implementations may include more or fewer messages and/or may include other types of messages without departing from the spirit of the invention.

The implementation of FIG. 8 may include client 110, NAS 145, destination 160, server 170, API 172, plug-in 174, policy server 176, first VLAN 180, second VLAN 185 and remediation server 190. The devices of FIG. 8 may exchange messages, such as request 810, measurements 815 and 815A, compliance result 817, policy name 820, policy data 825, integrity result 830 and 835, policy instruction 840, remediation instruction 845, data 850, and remediation data 855.

In one implementation, NAS 145 and client 110 may use a handshake 802 to exchange compliance information therebetween. Handshake 802 may include request 810, measurements 815, compliance result 817, and/or remediation instruction 845. Other implementations may include more or fewer messages in handshake 802. Request 810 may include a query from NAS 145 to client 110 for compliance information. For example, client 110 may attempt to log onto private network 150. NAS 145 may be configured to query client 110 on behalf of server 170 in order to determine the health, or compliance, of client 110 before allowing client 110 to access private network 150. NAS 145 may be configured to send request 810 to client 110 when client 110 attempts to log onto private network 150, when a change is detected in private network 150 or in client 110, at periodic intervals determined by NAS 145 and/or server 170, and/or when network policies change. In still other implementations, request 810 may not be used.

Measurements 815 may include information that can be used by server 170 and/or plug-in 174 to determine the compliance of client 110 with respect to a network policy. For example, in one implementation, client 110 may provide measurements 815 to NAS 145 in response to request 810. Measurements 815 may include a user name and password that can be used by server 170 to determine the identity of client 110 and/or may include other types of information related to client 110, such as information about software revisions installed on client 110, patches to software applications operating on client 110, antivirus definition updates installed on client 110, hardware configurations implemented on client 110, files residing on client 110, and/or destination devices that client 110 is trying to contact. Server 170 may determine the validity of an identity of client 110 via the user name and password. Server 170 may also pass the user name and password and/or other client information to API 172.

API 172 may pass measurements 815 to plug-in 174 as measurements 815A. Measurements 815A may include information in measurements 815 and/or may include additional information. For example, API 172 may supplement measurements 815 with information that identifies server 170, API 172, a status of server 170/API 172, etc.

Server 170 and/or API 172 may provide plug-in 174 with information about a policy that client 110 should be evaluated against. For example, API 174 may send policy name 820A to plug-in 174. Plug-in 174 may parse measurements 815A and/or policy name 820A and may extract data therefrom to produce policy data 825. Plug-in 174 may send policy data 825 to policy server 176. For example, plug-in 174 may send policy server 176 the user name, password, information about antivirus definitions running on client 110, and/or information about an antivirus policy that client 110 is supposed to be evaluated against.

Policy server 176 may process policy data 825 to produce integrity result 830 that can be used to determine whether client 110 complies with a policy. Policy server 176 may send integrity result 830 to plug-in 174. Plug-in 174 may process integrity result 830 and may produce integrity result 835 for use by API 172 and/or server 170. Server 170 may use integrity result 835 to produce policy instruction 840 for use by NAS 145 to grant or deny access to client 110. For example, policy instruction 840 may instruct NAS 145 to connect client 110 to destination 160 via second VLAN 185 when client 110 complies with the network policy. Client 110 may exchange data 850 with NAS 145, second VLAN 185 and destination 160 when client 110 complies with a network policy. Policy instruction 840 may instruct NAS 145 to connect client 110 to first VLAN 180 when client 110 does not comply with the network policy. First VLAN 180 may allow client 110 to access remediation server 190 to obtain information to bring client 110 into compliance with the network policy when client 110 does not comply with the network policy. Client 110 may exchange remediation data 855 with first VLAN 180 and remediation server 190 when client 110 does not comply with the network policy.

Remediation instruction 845 may include information that can be used by client 110 to correct deficiencies with respect to one or more policies. For example, when client 110 is not compliant with a policy, remediation instruction 845 may provide client 110 with a link to a web site that includes updates that will bring client 110 into compliance with the network policy (e.g., may provide client 110 with a link to remediation server 190 on first VLAN 180). In another implementation, remediation instruction 845 may provide client 110 with software that can be run to bring client 110 into compliance. In yet another implementation, remediation instruction 845 may include text that can be used by an operator of client 110 to bring client 110 into compliance.

Exemplary Processing

FIGS. 9A and 9B illustrate exemplary processing to evaluate and implement a network policy via system 100/102. In one implementation, the exemplary processing of FIG. 9A may be performed by server 170 and/or policy server 176. In other implementations, exemplary processing may be performed by other devices, such as network device 140 and/or destination 160. Implementations described herein may be used to evaluate the health, or compliance, of a client device. For example, client 110 may be checked to determine whether its software and/or hardware meet determined criteria, e.g., a revision level or a certain configuration, to determine whether client 110 is associated with a proper user identity, to determine whether client 110 is allowed to access certain network resources, e.g., destination 160, etc.

Implementations of system 100/102 may be configured to determine the compliance of client 110 at determined times. For example system 102, via NAS 145, server 170 and policy server 176, may check the compliance of client 110 when client 110 attempts to access a network, at determined intervals (e.g., once per day), when a change in a network parameter occurs, when malicious activity is detected on private network 150, when a new network policy is implemented, when client 110 attempts to access a protected resource, etc. In one implementation NAS 145 and/or server 170 may retrieve information from data structure 500 to determine when client 110 should be checked for compliance with respect to a network policy.

Client 110 may attempt to establish an 802.1x communication session with NAS 145. For example, client 110 may use extensible authentication protocol (EAP) to request LAN port access. EAP may operate as an envelope to carry different kinds of authentication challenge/responses, such as a user name and password. NAS 145 may receive EAP encapsulated data from client 110, such as AVPs, via measurements 815 (FIG. 8). Client 110 may process authentication information (e.g., AVP's received from NAS 145) via client plug-in 114. Client plug-in-114 may further be notified when authentication is complete. In one implementation, client plug-in 114 may initiate a re-authentication when client 110 determines that such an action should be performed.

Server 170 may receive client data (e.g., an AVP that includes a user name and password) via NAS 145 (block 910). NAS 145 may send an AVP to server 170 to have the user name and password validated so that NAS 145 can allow client 110 to access a destination device, such as destination 160. In one implementation, NAS 145 may provide AVPs to server 170 via tunnel-TLS (TTLS).

Server 170 may validate an identity of client 110 (block 920). For example, server 170 may be implemented as a RADIUS server that performs user authentication on behalf of NAS 145. Server 170 may identify the user name and password and may access a database, such as a user database stored in memory 230, to determine whether the user name and password are valid.

Server 170 may pass the user name/password and policy identifiers to plug-in 174 via API 172 (block 930). For example, server 170 may provide the AVP containing the user name and password to API 172 as measurements 815 along with policy identifiers (e.g., policy name 820) related to the user. Policy identifiers may include information that identify a policy, such as a policy name. API 172 may provide the AVP and policy identifier to plug-in 174 as measurements 815A and policy name 820A. In one implementation, plug-in 174 may be adapted to parse AVPs to extract information contained therein. Operation of plug-in 174 may be unique to particular policies, such as a first mode of operation for an antivirus plug-in and a second mode of operation for an operating system plug-in.

Policy requirements may be defined via plug-in 174 (block 940). For example, plug-in 174 may receive information related to a user identified via a user name in the parsed AVP. The information may identify a configuration of client 110, such as versions of hardware and/or software running on client 110, a group with which client 110 is affiliated, security information related to client 110, etc. In one implementation, a pointer to a table that includes the information may be keyed via the user name, a destination that client 110 is attempting to access, a network port that client 110 used to access NAS 145, etc. Information returned from the table may include a policy name that can be used to identify requirements for a policy. For example, a policy name of "antivirus" may be used to identify requirements for definition updates, operational status of the antivirus program, system scan status, etc. (FIG. 6).

Plug-in 174 may pass policy requirements to policy server 176 as policy data 825 (block 950). Policy server 176 may receive policy requirements and/or user/group information from plug-in 174 and may determine an integrity result therefrom. For example, plug-in 174 may send a user name and information about a computer related to the user (e.g., a version of an antivirus program running on the computer, status of antivirus definitions on the computer, etc.) to policy server 176 via a link. In another implementation, policy server 176 may have the policy requirements and plug-in 174 may send user and/or group information to policy server 176 so that policy server 176 can determine an integrity result for a policy related to the user/group. In still another implementation, policy server 176 may provide policy requirements to plug-in 174 to allow plug-in 174 to determine an integrity result. For example, plug-in 174 may parse AVPs based on policy requirements received from policy server 176 and may compare information in the parsed AVPs to information related to the policy related to the policy requirements received from policy server 176.

Referring now to FIG. 9B, plug-in 174 may receive a policy result from policy server 176 as integrity result 830 (block 960). In one implementation, policy server 176 may operate on user information and policy requirements received from plug-in 174 to determine a policy result for the user (e.g., client 110). Policy server 176 may provide plug-in 174 with a result having a format such as username:policyname:policyresult (e.g., Bill Smith:Engineering:Passed). In the above example, an employee Bill Smith may be related to an engineering group that has a policy related thereto. Policy server 176 may have determined that Bill Smith and/or a computer operated by Bill Smith complies with the engineering policy. Policy server 176 may provide a policy result of "failed" when a user and/or device do not comply with a policy administered via policy server 176. In another implementation, policy server 176 may send integrity result 830 to plug-in 174 as a data structure. For example, policy server 176 may send data structure 700 (FIG. 7) to plug-in 174.

Plug-in 174 may pass the policy result to server 170 via API 172 (block 970). Plug-in 174 may reformat the policy result received from policy server 176 into a format for use on server 170. Server 170 may use the policy result to generate a policy instruction that can be used by other devices in system 102, such as NAS 145.

Server 170 may send the policy instruction to NAS 145 via policy instruction 840 (block 980). Policy instruction 840 may instruct NAS 145 to allow client 110 to access a network and/or destination device when client 110 complies with a policy. In contrast, policy instruction 840 may instruct NAS 145 to deny access to client 110 and/or to connect client 110 to a portion of a network that is available to unauthorized clients 110, such as first VLAN 180 where client 110 can obtain information from remediation server 190 that can be used to make client 110 compliant with a policy.

NAS 145 may implement a policy with respect to client 110 based on policy instruction 840 received from server 170 (block 990). For example, NAS 145 may allow authorized clients 110 (i.e., clients complying with a policy) to access desired destinations and may prevent unauthorized clients 110 (i.e., clients not complying with a policy) from accessing certain destinations. For example, NAS 145 may quarantine client 110 when client 110 does not comply with a policy administered by policy server 176 and server 170. Quarantined clients 110 may be allowed to access only portions of a network that are used to make compliance information available to non-compliant clients 110. For example, a quarantined client may only be allowed to access remediation server 190 to download software that makes client 110 compliant with a policy administered by policy server 176 and server 170. Server 170 operating with NAS 145 may provide levels of access to client 110 based on the compliance of client 110 with respect to a policy.

Implementations described herein have been illustrated and discussed with respect to a networked environment. Other implementations may be adapted for use in non-networked environments. For example, a standalone device may have its compliance checked via a client side plug-in operating thereon. The client side plug-in may be configured to evaluate the compliance of the standalone device with respect to a hardware or software policy. The client side plug-in may include functionality of server 130/170/176 and/or network device 140/NAS 145 when operating in a standalone device. The client side plug-in can be upgraded or reconfigured to accommodate changes in the standalone device, such as the addition of new hardware or new software. Standalone implementations may be adapted for use in appliances, vehicles, aircraft, industrial devices or systems, testing devices, etc., without departing from the spirit of the invention.

CONCLUSION

Implementations described herein may allow a plug-in module to evaluate a policy on behalf of a host device, such as a server. The host device may use the policy result to implement a policy, such as a network policy, with respect to an endpoint.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 9A and 9B, the order of the acts may be modified in other implementations consistent with the principles of the invention. Further, non-dependent acts may be performed in parallel.

For example, implementations described herein can be implemented using devices and configurations other than those illustrated in the figures and described in the specification without departing from the spirit of the invention. Devices and/or components may be added and/or removed from the implementations of FIG. 1A-FIG. 4 and FIG. 8 depending on specific deployments and/or applications. Further, disclosed implementations may not be limited to any specific combination of hardware.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A device comprising:
a memory to store instructions; and
a processor to execute the instructions to:
send authentication information, related to a client device, and a policy identifier to a plug-in of the device,
the authentication information including a username and a password associated with the client device,
the authentication information being sent via an interface of the device,
the policy identifier being associated with the username,
the policy identifier identifying a policy against which the client device is to be evaluated,
identify, using the plug-in, a policy requirement for the policy,
the policy requirement being identified based on the policy identifier,
transmit, using the plug-in, the authentication information and the policy requirement to another device, and
receive a policy result from the other device via the plug-in,
the policy result being generated by the other device using the policy requirement,
the policy result identifying whether the client device complies with the policy, and
transmit a policy instruction, generated based on the policy result, to an additional device,
the policy instruction causing the additional device to:
connect the client device to a destination device when the policy result indicates that the client device complies with the policy, and
when the policy result indicates that the client device does not comply with the policy:
quarantine the client device, and
connect the quarantined client device to a remediation server to download information from the remediation server to bring the quarantined client device into compliance with the policy.

2. The device of claim 1, where the policy result identifies whether a health of the client device complies with the policy.

3. The device of claim 1, where the interface includes an application program interface.

4. The device of claim 1, where the interface sends the authentication information to the plug-in via an encapsulated stream.

5. The device of claim 1, where the other device includes a policy server.

6. The device of claim 1, where the device includes an authentication server.

7. A server device comprising:
a memory to store instructions; and
one or more processors to execute the instructions to:
  receive authentication information from a network device,
    the authentication information including a user name and a password associated with a client device,
  send the authentication information and a policy identifier to a plug-in module of the server device,
    the policy identifier being associated with the username,
    the policy identifier identifying a policy against which the client device is to be evaluated,
  identify, using the plug-in module, a policy requirement for the policy,
    the policy requirement being identified based on the policy identifier,
  transmit, using the plug-in module, the authentication information and the policy requirement to another network device;
  receive, via the plug-in module, a policy result from the other network device,
    the policy result being determined by the other network device based on the policy requirement, and
    the policy result indicating whether the client device complies with the policy,
  send, based on receiving the policy result, a policy instruction to the network device,
    the policy instruction causing the network device to:
      allow the client device to connect to a network when the policy result indicates that the client device complies with the policy, and
      when the policy result indicates that the client device does not comply with the policy,
        quarantine the client device, and
        allow the quarantined client device to connect to a remediation server to download information from the remediation server to bring the quarantined client device into compliance with the policy.

8. The server device of claim 7, where the processor is further to:
  send, using an application program interface of the server device, the authentication information to the plug-in module, and
  monitor, using the application program interface, a status of the plug-in module while the plug-in module performs operations on the authentication information, the policy identifier, or the policy result.

9. The server device of claim 8, where the processor is further to send, using the application program interface, policy requirements to the plug-in module.

10. The server device of claim 8, where, when sending the authentication information, the processor is to send, using the application program interface, sends the authentication information to the plug-in module via a tunnel.

11. The server device of claim 7, where, when receiving the authentication information, the processor is to:
  receive, using an application program interface, the authentication information via an extensible authentication protocol request.

12. The server device of claim 7, where the authentication information further includes information identifying a status of the client device.

13. The server device of claim 7, where the policy result comprises information that identifies the compliance of the client device with respect to the policy.

14. A plug-in module comprising:
input/output logic, implemented at least partially in hardware, to:
  receive authentication information related to a client device,
    the authentication information including a user name and a password associated with the client device,
  determine, using the authentication information, a policy identifier that identifies a policy against which the client device is to be evaluated,
    the policy identifier being associated with the username,
  identify a policy requirement for the policy,
    the policy requirement being identified based on the policy identifier,
  send the policy requirement and the authentication information to a policy server to identify whether the client device complies with the policy,
  receive an integrity result from the policy server,
    the integrity result identifying whether the client device complies with the policy,
  format the integrity result, and
  send the formatted integrity result to a host device,
    the host device using the formatted integrity result to produce an instruction that is used by a network device to grant or deny access to the client device based on whether the client device complies with the policy,
      the instruction causing the network device to:
        allow the client device to access a destination device when the integrity result indicates that the client device complies with the policy, and
        when the integrity result indicates that the client device does not comply with the policy:
          quarantine the client device, and
          allow the quarantined client device to connect to a remediation server to download information from the remediation server to bring the quarantined client device into compliance with the policy.

15. The plug-in module of claim 14, where the input/output logic is to communicate with an application program interface operating on the host device.

16. The plug-in module of claim 15, where, when receiving the authentication information, the input/output logic is to:
  receive encapsulated authentication information from the application program interface, and
  decapsulate the authentication information.

17. The plug-in module of claim 14, where the plug-in module is local to the host device and is connected to the policy server via a link.

18. A method comprising:
  receiving, by a device and from a network device, authentication information associated with a client device,
    the authentication information including a user name and a password associated with the client device;
  sending, by the device and via an application program interface of the device, the authentication information and a policy identifier to a plug-in module of the device, the policy identifier being associated with the username,
the policy identifier identifying a policy against which the client device is to be evaluated;

identifying, by the device and using the plug-in module, a policy requirement for the policy,
the policy requirement being identified based on the policy identifier;

transmitting, by the device and using the plug-in module, the authentication information and the policy requirement to another network device;

receiving, by the device and via the plug-in module, a policy result from the other network device,
the policy result being determined by the policy server based on the policy requirement, and
the policy result indicating whether the client device complies with the policy; and sending, by the device, an enforcement instruction to the network device,
the enforcement instruction causing the network device to:
connect the client device to a resource when the policy result indicates that the client device complies with the policy, and
when the policy result indicates that the client device does not comply with the policy:
quarantine the client device, and
connect the quarantined client device to a remediation server to download information from the remediation server to bring the quarantined client device into compliance with the policy.

19. A system comprising:
a memory that stores instructions; and
a processor to execute the instruction to:
receive authentication information from a network device when a client device attempts to access a network,
the authentication information including a user name and a password associated with the client device;
send the authentication information and policy information to a plug-in module,
the policy information being associated with the username,
the policy information identifying a policy against which the client device is to be evaluated;
receive an integrity result from the plug-in module,
the integrity result being produced by a policy server connected to the plug-in module,
the policy server producing the integrity result based on: the authentication information, and one or more policy requirements identified, by the plug-in module, using the policy information, and
the integrity result indicating whether the client device complies with the policy; and send a policy enforcement instruction, based on the integrity result, to the network device,
the policy enforcement instruction to:
cause, when the client device complies with the policy, the network device to connect the client device to a desired destination in the network, or
when the client device does not comply with the policy: cause the network device to quarantine the client device, and connect the client device to a remediation server to bring the client device into compliance with the policy.

20. The device of claim 3, where the application program interface is further to:
receive data associated with the client device, and
add additional information to the received data to form the authentication information.

21. The device of claim 20, where the additional information includes information about the application program interface or an authentication server connected to the application program interface.

22. The server device of claim 7, where the instruction to quarantine the client device includes information used by the client device to comply with the policy.

23. The server device of claim 22, where the information includes a link to a web site.

24. The server device of claim 22, where the information provides software used by the client device to comply with the network policy.

25. The server device of claim 22, where the instruction provides information to a user of the client device,
the information enabling the user to bring the client device into compliance with the policy.

* * * * *